United States Patent [19]

Monsheimer et al.

[11] 4,210,721

[45] Jul. 1, 1980

[54] METHOD FOR DISSOLVING COLLAGEN-CONTAINING SKIN TISSUES

[76] Inventors: Rolf Monsheimer, Walter-Rathenau-Str. 46, Darmstadt-Eberstadt; Ernst Pfleiderer, Grimmelshausenstr. 3, Darmstadt-Arheilgen, both of Fed. Rep. of Germany

[21] Appl. No.: 834,423

[22] Filed: Sep. 19, 1977

[30] Foreign Application Priority Data

Sep. 24, 1976 [DE] Fed. Rep. of Germany ....... 2643012

[51] Int. Cl.² ............................................. C12P 21/06
[52] U.S. Cl. ..................................... 435/69; 435/839; 435/836; 435/834; 435/832; 435/913
[58] Field of Search ................................... 195/6, 5, 29

[56] References Cited

U.S. PATENT DOCUMENTS

| | | | |
|---|---|---|---|
| 3,034,852 | 5/1962 | Nishihara | 195/6 |
| 3,530,037 | 9/1970 | Nishihara | 195/6 |
| 3,939,040 | 2/1976 | Monsheimer et al. | 195/6 |
| 4,019,956 | 4/1977 | Saby | 195/6 |

FOREIGN PATENT DOCUMENTS 303184 1/1918 Fed. Rep. of Germany .
2252281 3/1973 Fed. Rep. of Germany .
2533598 2/1976 Fed. Rep. of Germany .

*Primary Examiner*—Alvin E. Tanenholtz

[57] ABSTRACT

A method for dissolving collagen-containing skin tissue by hydrolyzing said tissue in a first stage in the presence of urea with an alkaline proteinase having an activity optimum between pH 9 and 13, said hydrolysis proceeding in a hydrolysis medium which is initially in the pH region optimum for the enzyme employed, and optionally further hydrolyzing said tissue in at least one further stage by adding a weakly alkaline, neutral, or acid proteinase to said hydrolysis medium.

13 Claims, No Drawings

METHOD FOR DISSOLVING COLLAGEN-CONTAINING SKIN TISSUES

The present invention relates to a method for dissolving collagen-containing skin tissues by enzymatic hydrolysis, whereby the liquid hydrolyzate can thereafter be biologically decomposed or, optionally, used further in commercially valuable products.

The enzymatic decomposition of skins and the like by proteinases is known in the art, whereby the commercial utilization of the products thus formed is generally the goal of the operation. As early as 1915 it was proposed to utilize those trimmings of limed hides—hereinafter also designated as "glue stock"—which were cut off after unhairing in the tannery because they were not useful for processing into leather, by subjecting the wastes, treated with diluted caustic soda, to the influence of proteolytic enzymes and, subsequently, by cooking them up in conventional fashion to form glue.

Above all, dissolving collagen-containing skin portions presents certain technical difficulties. The conception prevails that the intact helical regions of collagen can be cleaved only by enzymes of the collagenase-type and can only be brought into solution in this way.

It has already been proposed to employ certain types of neutral and/or alkaline proteinases, which do not have a collagenase-like effect, for the preparation of a partial hydrolyzate from pieces of skin.

In dissolving waste materials in the leather industry, the need to find methods which can be carried out with a minimum of technical measures and with the least possible burden on the environment stands in the foreground. It has now been found that machine fleshings, hide waste, shavings, and the like (i.e. essentially collagen-containing products of the leather industry which are not suitable for directly working up further), can be dissolved by hydrolysis employing proteolytic enzymes if such proteinases are employed whose activity optimum lies in the strongly alkaline region, i.e. at a pH from 9 to 13, and if the enzymatic reaction is carried out in the pH region optimum for the enzyme employed in the presence of urea. Proteinases having optimum activity at a pH from 9 to 11 are of particular interest. The source of the alkaline proteinases plays no decisive role. Enzymes derived from higher animals and plants, as well as from microorganisms, can be used.

The class of alkaline proteinases of bacterial origin, such as the enzymes isolated from bacillus strains, primarily subtilisins, should be especially mentioned. Among the subtilisins, those of group B are of particular interest [cf. P. D. Boyer, H. Lardy, and K. Myrbaeck: The Enzymes, 3rd Edition, Vol. III, page 566, Academic Press, New York (1973)].

Also preferred are the strongly alkaline proteinases which are obtained from *Bacillus licheniformis, Bacillus alcalophilus, Bacillus cereus,* and *Bacillus mycoides*. Optionally, certain enzymes included in the class of weakly alkaline to neutral proteinases (i.e. proteolytic enzymes whose activity optimum lies in the pH region from 6 to 8), but which show sufficient stability at pH 9, such as the neutral bacterial proteinase from *Streptomyces griseus,* can be used from the beginning together with the strongly alkaline proteinases.

The use of urea to denature proteins is known in the art. When obtaining the hair from hides with the help of a bacterial proteinase, the pre-treatment of the substrate with, for example, sodium perborate and urea, has been described.

It is known that proteinases are in part influenced in their activity or are denatured by urea at a certain threshold concentration. In all cases, this threshold concentration is to be set above a urea content of 1 mol per liter. On the other hand, it was not to be expected that urea in concentrations considerably below this threshold value, for example below 0.1 mol per liter, would influence the enzyme reaction at all, either positively or negatively.

Thus, it must be considered as extraordinarily surprising that, in the method according to the present invention, the enzymatic dissolving of skin wastes and the like by alkaline proteinases is promoted in a manner which is technically most highly desirable, both from the point of view of the decomposition rate and also of the degree of the decomposition, by the addition of urea in concentrations considerably below the aforementioned threshold value. The preferred region for urea additions to the enzymatic batch is from 0.01 to 0.08 mol per liter, particularly from 0.03 to 0.075 mol per liter, and especially from 0.05 to 0.07 mol per liter.

The reaction temperature is not really critical in the process according to the invention. However, the characteristic data (temperature optimum, stability limits, etc.) of the various enzymes which are employed are suitably observed. In general, reaction temperatures between 20° C. and 60° C., and suitably in the region between 35° C. and 40° C. when subtilisins are employed, are maintained.

The amount of enzyme depends on the kind and activity of the enzyme. As a rule, it is between 0.03 and 3.0%, based on the dry weight of the substrate.

The possibility of using non-pre-treated, as well as pre-treated (i.e. completely or partially denatured), skin material as a substrate is of particular interest. Otherwise, the enzymatic process according to the present invention is carried out according to existing experience for the individual enzymes.

The desired pH value is adjusted by the addition of suitable agents, for example by the addition of soda lye, potash lye, or sodium or potassium carbonate, optionally with the use of corresponding buffer solutions. The process according to the present invention has the advantage, inter alia, that hides, which are treated throughout in an alkaline medium, can be subjected directly to enzymatic hydrolysis.

The process can be carried out according to the present invention in the following way: if proceeding from material which has not been pre-treated, the skin wastes which are to be dissolved, such as hide wastes, shavings, etc., can be introduced directly into the hydrolysis medium having an alkaline pH by dipping or suspending. After the introduction of the material and after testing and, if necessary, adjustment of the pH and of the temperature to the desired values, the urea is added. After this has been dissolved and uniformly distributed, the necessary amount of enzyme is added. In many cases, pre-treated waste materials (glue stock, etc.) contain sufficient water, for example even up to 80 percent of their total weight, that urea and enzymes can be directly combined therewith, without the addition of further water. Saving of water is one of the objectives of the invention.

During the enzymatic reaction, thorough mixing of the batch can be accomplished in conventional ways, for example, by rotation, stirring, etc.

As the degree of hydrolysis increases, the pH of the solution (because of the liberation of oligomers and/or monomers from the protein) decreases to a value of 8.5. The reaction can be continued until the most extensive dissolving of the material. For this, the reaction times (particularly for the use of alkaline proteinases according to the explanatory examples) are generally less than three hours, as a rule one or two hours.

Optionally, undissolved portions can be mechanically removed from the solution, i.e. by means of filtration, a sieve, decantation, etc.

An important aspect of the aforementioned process is the possibility of biologically decomposing the hydrolyzate after conclusion of the reaction and of discharging it as harmless waste water in a pre-flooder or public sewer system.

However, in case further use of the hydrolyzate is intended, the enzyme batch can be worked up in the usual way, for example by heating above 80° C. for inactivation of the enzyme, concentration by removal of water, spray drying, and the like. If the aforementioned conditions are maintained, the hydrolysis products will be in a molecular weight range which is of interest for certain aspects of further processing.

Thus, the hydrolysis of machine fleshings with alkaline proteinase from *Bacillus subtilis* in the presence of 0.033 mol per liter of urea essentially gives peptides having a chain length of less than 10 amino acid units.

As a further valuable aspect of the process according to the present invention, it has been found that, surprisingly, the hydrolysis products which are obtained in powder form after removal of water in general exhibit little hygroscopicity or are non-hygroscopic.

On the other hand, if one works with urea additions to the enzymatic batch which are greater than about 0.16 molar, for example, the hydrolysis product from which water has been removed reacts hygroscopically according to present observations.

The process according to the present invention permits the disposal of skin wastes and the like in a very short time with a relatively small expenditure of energy and with a minimum of technical measures.

In addition, the process is ecologically completely harmless since the hydrolysis products are used further or are directly released into a pre-flooder or public sewer system.

A special embodiment of the process according to the invention involves carrying out the enzymatic dissolving in a first stage essentially as described above, i.e. using one or more alkaline proteinases in the presence of urea. After the expiration of a certain period of time (for example when, as a result of the inherent acidity of the hydrolysis products the pH of the batch has fallen beneath the activity or stability optimum of the alkaline proteinases employed) the process is then completed in a second stage or in one or more further stages by the addition of a weakly alkaline, neutral, or acid proteinase.

A pH of about 8.5 can be considered as the guiding value for beginning the second process step in which weakly alkaline, neutral, or acid proteinases are added. Understandably, the conditions for carrying out the second or further process steps can also be established arbitrarily by the addition of acids, acid salts, buffers, and the like which are harmless to enzymes.

In every case, adjustment to a pH value close to the activity optimum of the weakly alkaline, neutral, or acid proteinases, respectively, is recommended. Optionally, the temperature should be adjusted to the activity conditions of the enzymes chosen.

Proteinases which can be employed according to the present invention in the second or further stages are, for example, the pancreatic proteinases as well as bacterial and fungal proteinases having an activity optimum below about pH 8.5-9, such as the pronase complex from *Streptomyces griseus* as well as the enzymes derived from *Bacillus natto*, *Bacillus cereus*, and *Bacillus mycoides*, the enzymes from *Aspergillus* (*Aspergillus saitoi* and *Aspergillus oryzae*), *Paec. variote*, *Rhiz. chinensis*, *Mucor pusillus*, and the like, and vegetable proteinases such as papain, ficin, bromelain, inter alia. The enzyme-treated batch in the second and optional further process stages is carried out and worked up in the manner known for the particular enzyme. The carrying out of the process according to the present invention in two or more steps offers additional advantages if the latter steps are carried out with suitable proteinases whose pH optimum is below 8. The duration of the reaction for enzymatic hydrolysis in the second step is, as a rule, less than five hours, generally about four hours (again depending on the kind and activity of the enzyme employed). Thus, as a rule, a total reaction time of less than eight hours, and generally of less than six hours even for the two-stage embodiment and embodiments possibly employing further stages, can be reckoned with.

Further, reaction in an acid medium offers the possibility of totally or partially decomposing the urea present by the addition of urease (activity maximum between pH 6 and 7) with the formation of completely harmless ammonium salts.

Additives known per se for enzymatic reactions, such as activators, stabilizers, and the like, can be used according to the method of the present invention. The proteolytic activity of the enzymes is usually determined according to the Anson hemoglobin method [M. L. Anson, J. Gen. Physiol. 22, (1939)] or according to the Loehlein-Volhard method, in which case the activity is expressed in Loehlein Volhard units ("LVU") [Die Loehlein-Volhard'sche Methode zur Bestimmung der proteolytischen Aktivitaet, Gerbereichem. Taschenbuch, Dresden-Leipzig (1955)]. By one LVU is to be understood that amount of enzyme which digests 1.725 mg of casein under the specific conditions of the method.

In the following examples, units derived from the Anson method are employed for determining the activity of those enzymes active in the acid region. These units are designated as "Proteinase Units (hemoglobin)", "$U_{Hb}$". One $U_{Hb}$ corresponds to the amount of enzyme which catalyses the liberation of fragments, soluble in trichloroacetic acid, from hemoglobin equivalent to 1 micromol of tyrosine per minute at 37° C. (measured at 280 nm). 1 $mU_{Hb} = 10^{-3}\ U_{Hb}$.

A better understanding of the present invention and of its many advantages will be had by referring to the following specific examplles given by way of illustration.

EXAMPLE 1—One Stage Process 1 kg of wet glue stock from calf hides, containing 20.6 percent by weight of dry matter (determined according to IUP-standard IUC-5 after pre-drying below 50° C.), which has been cut up in a meat mincer is weighed into a two liter glass beaker. Subsequently, it is heated to 50° C. in a water bath. The pH value is at first 10. Thereafter, the following are added with stirring:

1 g of alkaline bacterial proteinase from *Bacillus licheniformis* (9000 LVU);

4 g of urea; and 5 g of ammonium sulfate. +) It is surmised, that ammonium sulfate aids the enzymatic reaction by stabilizing the enzyme.

After stirring for one hour, the material is more than 90 percent hydrolyzed. After separation of the skin fat and residue, 750 to 800 g of pure hydrolyzate are obtained. This contains from 8 to 10 per cent of dry substance.

EXAMPLE 2—One Stage Process 1 kg of wet limed splits of cow hides, containing 43.2 percent by weight of dry matter (determined according to IUP-standard IUC-5 after pre-drying below 50° C.), chopped up in a meat mincer, is weighed into a two liter glass beaker. The material is warmed to 50° C. in a water bath with stirring. After this temperature has been reached, the following are added:

1 g of alkaline bacterial proteinase from *Bacillus subtilis* (9000 LVU);

4 g of urea; and 5 g of ammonium sulfate.

After two hours of stirring, the material is 95 per cent hydrolyzed. In comparison, a cow hide split which is treated only by heating goes into solution to the extent of about 15 per cent in this time.

During the two hour treatment time, the pH value falls from 9.5 to 7.5. At the end of the treatment, the density of the hydrolyzate is determined to be 7.5° Be at 20° C. After separation of the residue, 600 to 650 g of hydrolyzate having a dry solids content of 19 to 20 percent are obtained.

EXAMPLE 3—Two Stage Process 1 kg of wet glue stock from cow hides, containing 15.0 percent by weight of dry matter (determined according to IUP-standard IUC-5 after pre-drying below 50° C. chopped up in a meat mincer, is weighed into a two liter glass beaker. The material is warmed to 50° C. in a water bath without agitation. Now the following are added:

0.5 g of alkaline bacterial proteinase from *Bacillus alcalophilus* (9,000 LVU);

2.0 g of urea; and 2.5 g of ammonium sulfate.

The material is reacted for one hour at 50° C. During this time, the pH value of the enzyme batch falls from 9.0 to 7.0. A conversion of 60 to 70 per cent of the weighed material is achieved.

The following are now added and the treatment is continued for an additional four hours in a water bath without agitation:

0.2 g of papain (160 mU$_{Hb}$/mg at pH=7.5);

0.12 g of fungal proteinase from *Aspergillus saitoi* (3,000 LVU);

1.0 g of ammonium sulfate;

7.0 g of sulfuric acid (98%, technical, diluted 1:10).

After a treatment time of five hours, a total conversion of 90 per cent is achieved. After separation of the skin fat and residue, 807 g of hydrolyzate having a dry solids content of 9.5 to 10 per cent are obtained.

EXAMPLE 4—One Stage Process

One kg of native wet glue stock from cow hides, containing 15.3 percent by weight of dry matter (determined acccording to IUP-standard IUC-5 after pre-drying below 50° C.), is weighed into a two liter glass beaker. Subsequently, the material is heated to 50° C. with stirring on a water bath. One hour is required for this. Subsequently, the following are added and the batch is stirred for three hours at 50° C.:

0.8 g of neutral bacterial proteinase from *Streptomyces griseus* (7,000 LVU);

1.0 g of alkaline bacterial proteinase from *Bacillus subtilis* (9,000 LVU) (a group B subtilisin);

8.0 g of urea; and 10.0 g of ammonium sulfate.

After separation of fat and residue in a separatory funnel, 750 to 800 g of hydrolyzate containing 9.0 to 10 per cent of dry solids are obtained. The pH of the hydrolyzate falls from an initial 9.0 to 7.5 during the treatment.

EXAMPLE 5—Two Stage Process 1 kg of native wet glue stock, containing 15.0 percent by weight of dry matter (determined according to IUP-standard IUC-5 after pre-drying below 50° C.), from cow hides is weighed into a two liter glass beaker. It is heated in a water bath at 50° C. without stirring. One hour is required. The batch at first has a pH value of 9.8–10. Then the following are added:

1 g of alkaline bacterial proteinase from *Bacillus licheniformis* (9,000 LVU);

4 g of urea; and 5 g of ammonium sulfate.

After a reaction time of one hour, 40 per cent of the weighed glue stock is hydrolyzed.

In the second method step, further treatment occurs at pH 5.0. The following are added:

0.4 g of papain (160 mU$_{Hb}$/mg at pH=7.5);

0.25 g of fungal proteinase from *Aspergillus oryzae* (3,000 LVU);

1.0 g of ammonium sulfate; and 11.0 g of sulfuric acid (98%, technical, diluted 1:10).

After a further four-hour reaction time at 50° C., a conversion of 90 per cent is achieved. 800 g of hydrolyzate having a dry solids content of 10 per cent are obtained.

EXAMPLE 6—One Stage Process 500 g of dry chrome leather shavings, containing 42.8 percent by weight of dry matter (determined by IUP-standard IUC-5 after pre-drying below 50° C.), are weighed into a two liter beaker. They are first combined with 1000 cm$^3$ of water in which 20 g of caustic soda have previously been dissolved. The material is heated for one hour at 100° C. for denaturization.

Thereafter the following are added and the batch is left in a water bath for two hours at a reaction temperature of 50° C.:

2.0 g of alkaline bacterial proteinase from *Bacillus subtilis* (9,000 LVU);

8.0 g of urea; and 10.0 g of ammonium sulfate.

A conversion of 90 per cent, calculated on the starting product, is achieved. The weight of the hydrolyzate obtained is 1200 to 1300 g having a dry solids content of 17 to 18 per cent.

EXAMPLE 7—One Stage Process 500 g of dry chrome tanned splits, containing 38.2 percent by weight of dry matter (determined according to IUP-standard IUC-5 after pre-drying below 50° C.), were weighed into a two liter glass beaker. 500 of water in which 20 g of caustic soda had been dissolved were added. The batch was first heated for one hour at 100° C. for denaturization. Enzymatic hydrolysis followed by heating in a water bath at 50° C. with:

2.0 g of alkaline proteinase from *Bacillus cereus* (9,000 LVU);
8.0 g of urea; and
10.0 g of ammonium sulfate.

After a treatment time of two hours, 70–75 percent of the weighed material was hydrolyzed.

What is claimed is:

1. A method for disposing of collagen-containing waste material of the leather industry which is unsuitable for directly working up further by decomposing said waste material to form a water-soluble hydrolyzate which is recoverable or disposable, which method consists essentially of hydrolyzing said waste material in an aqueous hydrolysis medium, the active components of which consist essentially of 0.01 to 0.08 mol per liter of urea and from 0.03 to 3 percent, by dry weight of the waste material being treated, of an alkaline proteinase having an activity optimum between pH 9 and 13, said hydrolysis medium at least initially having a pH in the pH region optimum for the alkaline proteinase employed.

2. A method for disposing of collagen-containing waste material of the leather industry which is unsuitable for directly working up further by decomposing said waste material to form a water-soluble hydrolyzate which is recoverable or disposable, which method consists essentially of hydrolyzing said waste material in an aqueous hydrolysis medium, the active components of which consist essentially of 0.01 to 0.08 mol per liter of urea and from 0.03 to 3 percent, by dry weight of the waste material being treated, of an alkaline proteinase having an activity optimum between pH 9 and 13, said hydrolysis medium at least initially having a pH in the pH region optimum for the alkaline proteinase employed, continuing the hydrolysis until the pH value of the hydrolysis medium falls to at least about 8.5, and then adding a weakly alkaline, neutral, or acid proteinase to the hydrolysis medium, adjusting the pH, if necessary, to the activity optimum of the added proteinase, and continuing the hydrolytic decomposition.

3. A method as in claim 1 wherein the concentration of urea is above 0.01 mol per liter and below 1 mol per liter.

4. A method as in claim 1 wherein the concentration of urea is from 0.01 to 0.08 mol per liter.

5. A method as in claim 1 wherein said alkaline proteinase is derived from a Bacillus strain.

6. A method as in claim 1 wherein said alkaline proteinase is derived from *Bacillus subtilis*.

7. A method as in claim 6 wherein said alkaline proteinase is a subtilisin of group B.

8. A method as in claim 1 wherein said alkaline proteinase is derived from *Bacillus licheniformis*.

9. A method as in claim 1 wherein said alkaline proteinase is derived from *Bacillus alcalophilus*.

10. A method as in claim 1 wherein said alkaline proteinase is derived from *Bacillus cereus*.

11. A method as in claim 1 wherein said alkaline proteinase is derived from *Bacillus mycoides*.

12. A method as in claim 2 wherein said weakly alkaline, neutral, or acid proteinase is added to said hydrolysis medium when said hydrolysis medium has reached a pH value of about 8.5.

13. A method as in claim 2 wherein papain and a fungal proteinase derived from an *Aspergillus* strain are added to said hydrolysis medium.

* * * * *

UNITED STATES PATENT AND TRADEMARK OFFICE
CERTIFICATE OF CORRECTION

PATENT NO. : 4,210,721
DATED : July 1, 1980
INVENTOR(S) : Monsheimer et al.

It is certified that error appears in the above-identified patent and that said Letters Patent are hereby corrected as shown below:

This application has been assigned as follows:

Assignee: Röhm GmbH, Darmstadt,
Federal Republic of Germany

Signed and Sealed this

Eighteenth Day of November 1980

[SEAL]

Attest:

SIDNEY A. DIAMOND

Attesting Officer     Commissioner of Patents and Trademarks